United States Patent [19]

Peterson

[11] Patent Number: 4,695,888

[45] Date of Patent: Sep. 22, 1987

[54] VIDEO CAMERA WITH AUTOMATICALLY VARIABLE DIAPHRAGM AND SHUTTER SPEED CONTROL

[75] Inventor: Dean M. Peterson, Escondido, Calif.

[73] Assignee: Eastman Kodak Company, Rochester, N.Y.

[21] Appl. No.: 930,200

[22] Filed: Nov. 13, 1986

[51] Int. Cl.$^4$ ............................................. H04N 5/30
[52] U.S. Cl. ................................. 358/213.13; 358/225
[58] Field of Search .......................... 358/213.13, 225; 352/216, 217

[56] References Cited

U.S. PATENT DOCUMENTS

| | | | |
|---|---|---|---|
| 3,300,271 | 1/1967 | Yamamoto | 352/214 |
| 3,303,271 | 2/1967 | Hecker | 178/5 |
| 3,490,835 | 1/1970 | Nemeth et al. | 352/141 |
| 3,531,194 | 9/1970 | Roppel et al. | 352/216 |
| 3,602,585 | 8/1971 | Steibl et al. | 352/216 |
| 3,787,116 | 1/1974 | Shimizu | 352/141 |
| 4,161,000 | 7/1979 | Cleveland | 358/225 |
| 4,171,529 | 10/1979 | Silberberg et al. | 358/209 |
| 4,257,693 | 3/1981 | Hirate et l. | 352/209 |
| 4,301,476 | 11/1981 | Keller et al. | 358/209 |
| 4,471,388 | 9/1984 | Dischert | 358/320 |
| 4,504,866 | 3/1985 | Saito | 358/213 |
| 4,532,550 | 7/1985 | Bendell et al. | 358/213 |
| 4,545,659 | 10/1985 | Swinehart et al. | 352/216 |
| 4,551,763 | 11/1985 | Swinehart et al. | 358/225 |
| 4,571,629 | 2/1986 | Horio et al. | 358/225 |

FOREIGN PATENT DOCUMENTS 3022786  1/1981  Fed. Rep. of Germany .

Primary Examiner—Gene Z. Rubinson
Assistant Examiner—L. C. Schroeder
Attorney, Agent, or Firm—William F. Noval

[57] ABSTRACT

A compact video camera which is operable at variable shutter speeds to capture high speed events which may be recorded and played back in slow motion for scene analysis. The video camera includes an image sensor, a variable diaphragm and a variable speed shutter. The variable diaphragm and variable speed shutter are controlled automatically to maintain constant the peak to peak signal level of the video signal produced by the image sensor so that the highest shutter speed is always maintained as scene brightness changes.

2 Claims, 8 Drawing Figures

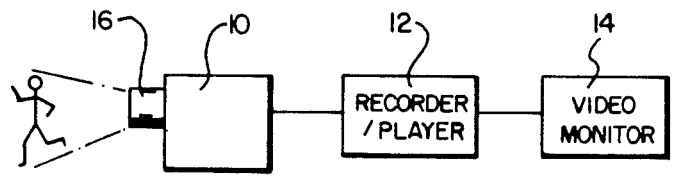
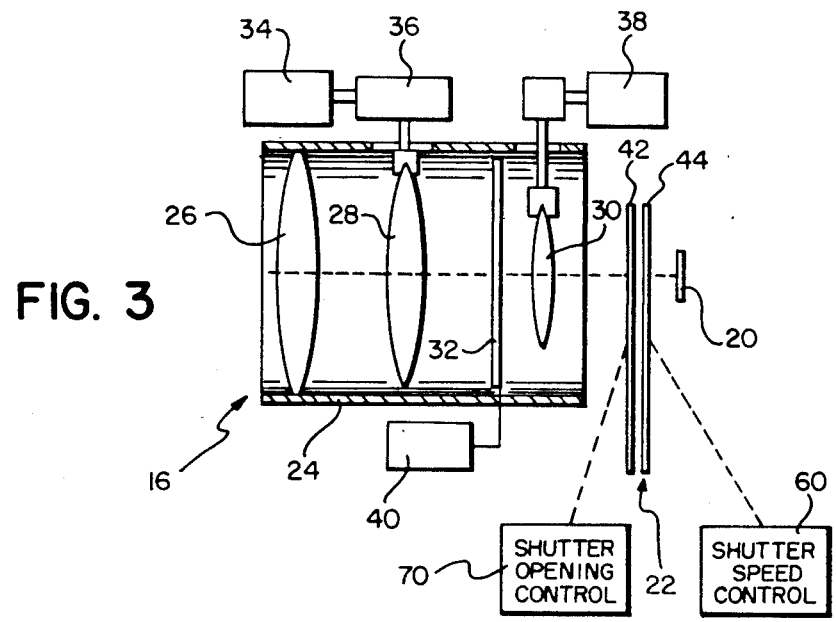
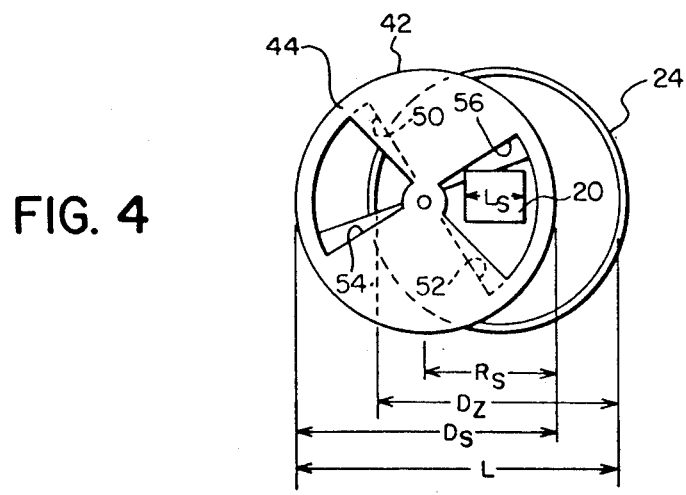

VIDEO CAMERA WITH AUTOMATICALLY VARIABLE DIAPHRAGM AND SHUTTER SPEED CONTROL

BACKGROUND OF THE INVENTION

This invention relates in general to video apparatus capable of capturing fast moving events. More particularly, this invention relates to video apparatus including a compact, easy-to-use variable video camera with automatically variable diaphragm and shutter control.

The need often arises for recording high speed or rapidly changing scenes so that the scene may be played back in slow or stopped motion in order to analyze the scene. Where a standard video camera is used to record high speed events, the frame rate of the camera is too slow to stop the motion of the event. There is thus a likelihood of blurring of the recorded image so that analysis of the scene is difficult. Such analysis capabilities are for example, desirable in analyzing the motions of an athlete while engaged in an athletic event, such as football, baseball, golfing, or the like. Thus, it may be desirable to capture the motion of a swinging golf club in order to correct a defect in the golfer's swing. Stop action shots may be used in football games in order to analyze the correctness of a referee's call on a play, or to analyze the movements of a football player, such as those of a quarterback in throwing a football to a receiver. Although motion picture cameras have been used to analyze such athletic events, there have been problems since film is costly and the delay between filming and viewing is far too long to be useful for more than archival use. Although various video systems have been proposed which would obviate these objections to the use of film by reducing recording media cost and making playback instantly available through a television monitor, the video systems have been expensive, heavy, bulky, and hard to use. Moreover, where manually adjustable shuttered video cameras have been proposed, the possibility existed that a specific high speed event is not captured because an inadequate shutter speed has been chosen by the camera operator.

SUMMARY OF THE INVENTION

According to the present invention, there is provided video apparatus which includes a video camera for capturing high speed events. The camera includes an image sensor for converting the image of a scene into a video signal having a predetermined field or frame rate; a variable diaphragm for controlling the light intensity of an image on the sensor and a variable speed shutter for controlling the interval during which the sensor is exposed to the image. The diaphragm and shutter are controlled in response to changing scene brightness such that the highest shutter speed is set in order to minimize blur. In a variable speed mode, first the diaphragm opening is varied while the highest shutter speed is maintained, then with the diaphragm fully opened, the shutter speed is varied in order to maintain constant signal level.

BRIEF DESCRIPTION OF THE DRAWINGS

In the following description of the drawings, like elements are numbered with like numbers.

FIG. 1 is a block diagram of a high speed video system;

FIGS. 3 and 4 are respectively a top plan and a frontal view of the compact configuration of the major components of the camera of FIGS. 1 and 2;

DESCRIPTION OF THE PREFERRED EMBODIMENT

Figure 2:
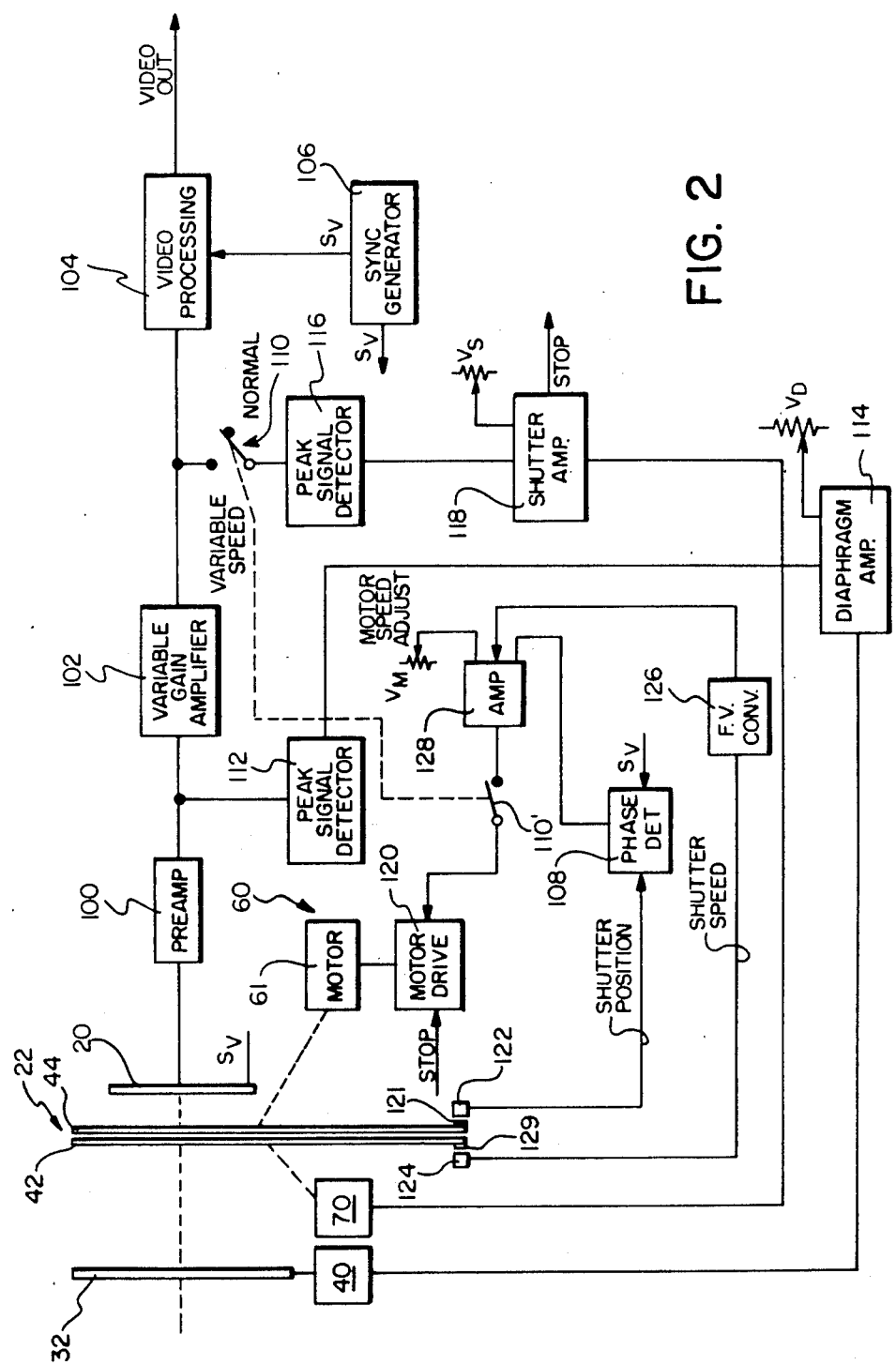
FIG. 2 is a partially diagrammatic, partially schematic view of a high speed video camera, according to a preferred embodiment of the present invention.

Referring now to the Figures, there is shown a preferred embodiment of the invention. In FIG. 1, a video system for recording high speed events and for playing them back at slow or stopped motion is shown and includes a high speed video camera 10, a video cassette recorder/player 12, and a video monitor 14. Video camera 10 is a compact video camera which converts the image of a scene into a video signal. As will be explained in more detail later, the video camera 10 includes, in a compact, easy to use configuration a zoom lens 16, an imager 20, (such as a CCD or MOS solid state imager) for converting the image of a scene into a video signal, and a compact rotary shutter arrangement 22 located between zoom lens 16 and imager 20 for controlling the interval of exposure of the imager during each video field or frame. Camera 10 and recorder/player 12 may be separate units or may be combined into a so-called "Camcorder".

Referring now to FIGS. 3 and 4, there is shown the compact configuration of the major components of camera 10 to provide a lightweight, easy to use camera for use in field conditions such as at athletic events or the like. Camera 10 includes a zoom lens barrel 24 including a front optical assembly 26, an intermediate movable optical assembly 28, and a rear optical assembly 30. A variable diaphragm 32 is positioned between optical assemblies 28 and 30. A zoom motor 34 is coupled to lens assembly 28 by means of gear assembly 36 and responds to zoom lens control signals to move assembly 28 either to the left or right (as shown in FIG. 3) to change the zoom ratio of the zoom lens 16. An automatic focus motor 38 is provided to move lens assembly 30 to the left or right in order to maintain the image projected onto imager 20 in focus through automatic focus control signals produced in a well known manner. An aperture control motor 40 is linked in a suitable manner to variable aperture 32 to change the opening of aperture 32 in order to control the light intensity of an image which is projected onto imager 20. Motors 34, 38, and 40 and associated linkages are dimensioned to make camera 16 as compact as possible.

Variable speed shutter 22 includes rotatable shutter discs 42 and 44 each of which has a pair of opposed sector shaped openings 50, 52 and 54, 56 (see FIG. 4). Openings 50 and 54 and 52 and 56 are alignable with imager 20. Shutter discs 42 and 44 are rotated at the same rotational speed (by shutter speed control 60) but are rotationally adjustable with respect to each other (by shutter opening control 70) so that the shutter opening postions may be varied to vary the speed of exposure of imager 20 to an image projected onto it by zoom lens 16.

As shown in FIG. 4, the diameter $D_S$ of shutter discs 42 and 44 and the diameter $D_Z$ of zoom lens barrel 24 are dimensionally similar. Moreover, the radius $R_O$ of shutter openings 50-56, the length $L_S$ of sensor 20 and the radius $R_S$ of shutter discs 42 and 44 are dimensioned to make the combination of camera components compact for easy operator handling. As an example, if sensor 20 has a length $L_S$ of $\frac{1}{2}''$, the radius $R_O$ of openings 50-56 is chosen to be somewhat greater and the overall diameter $D_S$ of shutters 42, 44 may be 2 inches or less. If the diameter of zoom lens barrel 24 is also about 2 inches, the lateral dimension L is less than $1\frac{1}{2}$ times the dimension of either the lens barrel or the shutter. This is in contrast to known shutters which are substantially (8X or 10X) larger than the focal plane dimension of the sensor or film.

Figure 6:
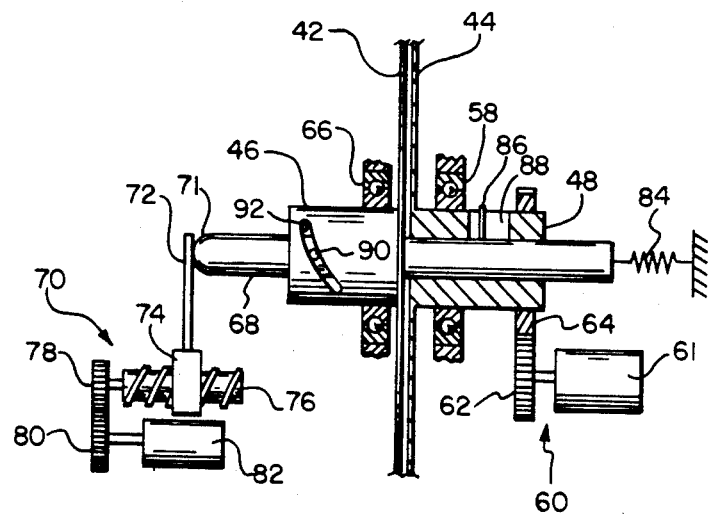
FIG. 6 is a partially sectional diagrammatic view of a variable speed shutter.

Referring now to FIG. 6, there is shown a variable speed shutter including one arrangement for rotatably adjusting shutter discs 42 and 44. As shown, disc 44 fixed to hollow shaft 48 is rotatably mounted in bearing 58 and is driven by shutter speed control 60 which includes motor 61 and gears 62 and 64. As will be described in more detail later, disc 44 is rotated at a speed that is related to the video field rate of camera 10 and to the number of openings in disc 44. Since disc 44 has two openings which are sequentially brought into alignment with the imager 20, disc 44 is rotated at a speed of 30 rotations per second for the NTSC field rate of 60 fields per second. Shutter disc 42 is fixed to hollow shaft 46 which is rotatably mounted in bearing 66. The axes of rotation of spaced shafts 48 and 46 are coincident. A push rod 68 is rotatably mounted within shafts 46 and 48 and is axially slidable by means of shutter opening control 70. Control 70 includes an actuator member 72 which engages end 71 of push rod 68. Member 72 is mounted on follower 74 which is driven by helical gear 76 and gear pairs 78 and 80 by means of a reversible motor 82. Push rod 68 is biased against member 72 by a spring 84.

Push rod 68 is mounted for relative axial movement with respect to hollow shaft 48 by means of a pin 86 fixed to rod 68. Pin 86 is constrained from radial movement but is slidable axially within slot 88 of shaft 48. Rod 68 is concurrently movable both slidably and rotationally with respect to hollow shaft 46 by means of pin 90 fixed to rod 68 which projects into helical slot 92 in shaft 46.

Movement of rod 68 to the right or left (as shown in FIG. 6) by means of control 70 causes pin 90 to move in helical slot 92. As pin 90 follows in slot 92, rod 68 will be rotated. As rod 68 is moved both axially and rotationally, pin 86 moves axially in slot 88 and rotates shaft 48 and shutter 44. Openings 50-56 in shutters 42 and 44 will be moved relative to each other thereby increasing or decreasing the relative shutter opening and thereby the interval during which sensor 20 is exposed to an image.

Figure 7:
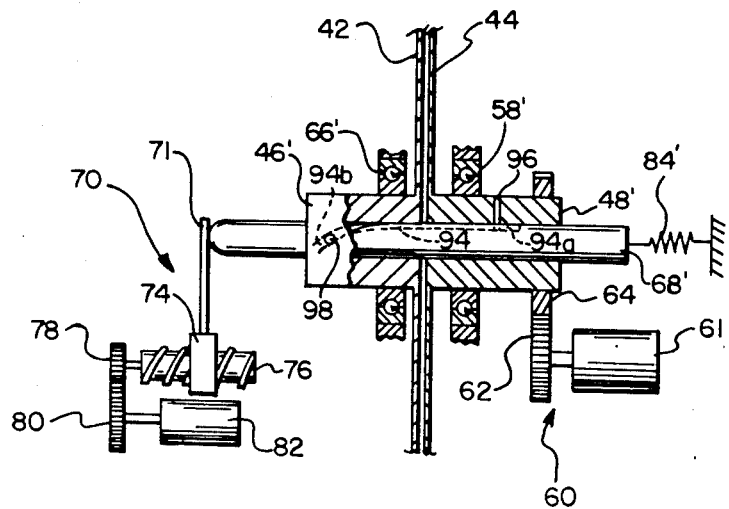
FIG. 7 is a partially sectional diagrammatic view of another variable speed shutter.

Another shutter arrangement is shown in FIG. 7. As shown, shutters 42 and 44 are mounted on hollow shafts 46' and 48' which are rotatably mounted respectively in bearings 66' and 58' and which have coincident axes of rotation. A push rod 68' is axially mounted in shafts 46' and 48' and has in its outer surface a slot which extends axially in the region of shaft 48' and disc 44 and helically in the region of shaft 46' and disc 42'. A pin 96 fixed to shaft 48' extends into axial segment 94a of slot 94 and a second pin 98 fixed to shaft 46' extends into the helical segment 94b of slot 94. When shaft 68' is slid within shafts 46' and 48' by control 70, pin 96 will follow in axial slot segment 94a and pin 98 will follow in helical slot segment 94b in rod 68'. This will cause relative movement of shutter discs 42' and 44' with respect to each other in order to increase or decrease the relative shutter opening and shutter speed.

As shown in FIG. 2, the video signal produced by imager 20 is amplified by preamplifier 100 and a variable gain amplifier 102. Video processing circuit 104 converts the signal from amplifier 102 into an NTSC composite video signal for feed to the recorder/player 12. A sync generator 106 provides various synchronizing and blanking signals such as a vertical sync signal $S_V$ which is supplied to imager 20, video processing circuit 104 and as a reference signal to the phase detector 108.

According to an aspect of the invention, camera 10 is selectively operable in a normal mode or a variable shutter speed mode. In the normal mode, shutter 22 is stationary and control of the light intensity of an image on imager 20 is effected solely by means of variable diaphragm 32. In the variable speed mode, both the intensity of light and the interval of exposure within a field interval is controlled by means of variable diaphragm 32 and variable shutter 22. A switch 110 is operable by the camera operator to effect one of the modes of operation.

In the normal mode of operation, shutter 22 is stationary and apertures 54, 50 or 56, 52 of shutter discs 42 and 44 are aligned with imager 20 to allow the full image to be projected upon imager 20. A peak signal detector 112 measures the signal after it has been amplified by preamplifier 100 and the detected signal is compared to a reference voltage $V_D$ in diaphragm differential amplifier 114. When the camera is not in use, diaphragm 32 is fully closed in order to prevent damage to imager 20 from excessively bright light. During camera operation, the intensity of light on imager 20 is controlled so that the video signal is maintained at a predetermined peak to peak value (typically 1 volt P—P). Thus, if the light intensity is low, diaphragm 32 will be opened more widely in order to allow more light to fall on imager 20. Conversely, if the intensity of light from the scene is high, diaphragm 32 will be closed down to a small aperture in order to maintain the proper signal level. Thus, diaphragm control circuitry maintains a constant intensity of light on imager 20.

Figure 5A:
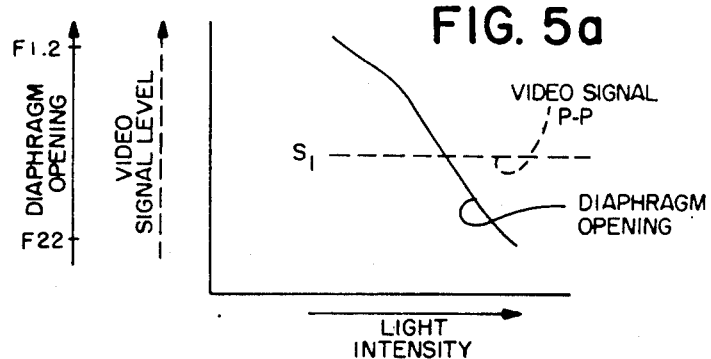
FIGS. 5a–5b are respective graphs illustrating the operation of the high speed video camera of FIG. 2.

This mode of operation is illustrated in FIG. 5a, which depicts a graph of light intensity versus diaphragm opening and video signal level. The video signal level is shown in dashed lines as held constant at a level $S_1$ (e.g., 1 volt peak to peak). As the light intensity decreases, the diaphragm opening is increased. This is depicted in the solid line graph labeled "diaphragm opening". As illustrated, the f stop increases from f/22 to f/1.2 as light intensity decreases.

The variable shutter speed mode integrates control of the variable aperture 32 with the variable shutter 22 to effect stop motion imaging of fast moving or changing events. In this mode, the fastest shutter speed is always set automatically in order to relieve the camera operator of the necessity of manually changing shutter speeds according to varying scene action changes. This provides the operator with a wider range of options in operating the camera. Moreover, as the light intensity of a scene diminishes, the peak to peak signal level is maintained constant by first controlling the variable aperture and then controlling the variable speed shutter.

This assures the fastest shutter speed despite varying scene brightness.

Figure 5B:
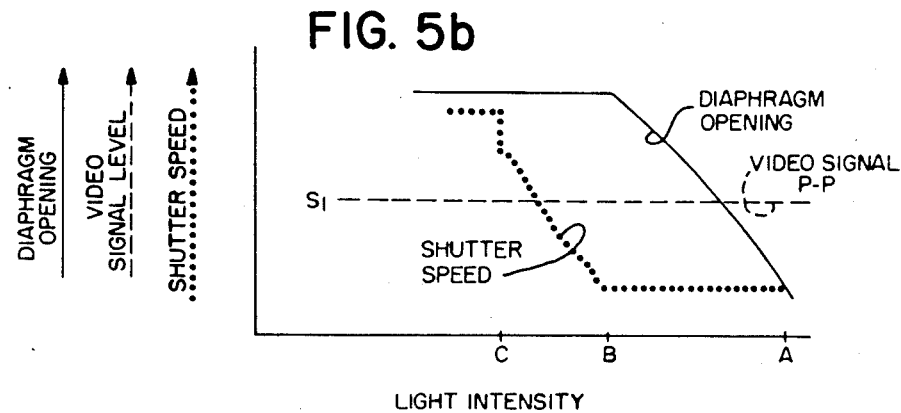

This is shown in FIG. 5b in which the peak to peak video signal level is represented by a constant signal level dashed line. In the variable speed shutter mode, the fastest shutter speed is maintained for given light conditions and the diaphragm is controlled in order to maintain a constant peak to peak video signal. Thus, as the scene brightness is varied over the range A to B, the shutter speed is maintained at its fastest speed, such as 1/10,000 sec. while the diaphragm opening is varied between a minimum and maximum range. This is depicted by the sloping solid line for the diaphragm opening and the horizontal dotted line for the shutter speed. If the scene brightness should decrease below level B, the diaphragm opening will be maintained at the maximum open position and the variable shutter will be controlled to decrease shutter speed until the light intensity or scene brightness C is reached. At this level, the relative angle of opening of the shutter disc openings is at a maximum (i.e., the openings are aligned) variable shutter 22 no longer capable of being adjusted. At this point, shutter discs 42 and 44 are stopped with the maximum shutter opening aligned with imager 20. The effective shutter speed then becomes the field rate of the camera (e.g., 1/60 sec). As scene brightness continues to decrease either the peak-to-peak video signal lessens or the gain of variable gain amplifier 102 is increased.

Referring now to FIG. 2, there is shown circuitry for controlling the variable speed shutter 22. Closing of switch 110 connects peak signal detector 116 to the output of variable gain amplifier 102. The peak signal is detected and applied to a shutter differential amplifier 114 which compares the peak signal to a reference signal $V_S$. If the peak signal is below the reference level, a control voltage will be applied to shutter control 70 to vary the relative position of shutter disc 42 with respect to shutter disc 44. As described above, a control signal is produced by differential amplifier 114 only when the light intensity drops below level B in FIG. 5b. For light intensities above level B, the shutter speed is maintained at the fastest shutter speed that variable shutter 22 is capable. Thus, the smallest relative opening between a pair of openings 50, 54 or 52, 56 of discs 42 or 44 is effected.

For light intensities above level B, the peak to peak video signal level will be maintained constant by varying diaphragm 32. The control loop response relating to diaphragm control is faster than the control loop response relating to shutter control so that the diaphragm opening will be varied before shutter speed is varied.

As the light intensity decreases from level B to level C, the shutter discs 42 and 44 are rotated so as to increase the effective shutter opening until the maximum shutter opening is attained with shutter openings 50, 54 and 52, 56 being aligned. This minimum shutter speed is limited by the angle of sector openings 50-56. For example if an opening (50-56) in disc 42, 44 has an angle of 60°, then the minimum shutter speed is 1/180 sec (i.e. 60°/180°×1/60 sec.).

At this level of light intensity, shutter amplifier 118 will produce a stop signal which is applied to shutter motor driver 120 to stop the shutter discs 42 and 44 so that aligned openings 50, 54, or 52, 56 are coextensive with imager 20. At this light intensity level, the maintenance of the peak to peak video signal at a constant level will be difficult unless, as explained above, automatic gain control is effected to increase the gain of amplifier 102 as the detected output signal from amplifier 102 decreases.

The circuit of FIG. 2 also includes a shutter speed control circuit 60 for maintaining the rotational speed of shutter discs 42 and 44 at a predetermined value and for synchronizing the phasing of the effective opening of discs 42 and 44 with the vertical sync of the video signal. Disc 44 is provided with a position indicator 121 which is detected by detector 122 to produce a shutter position signal. This signal is compared to the vertical sync signal by phase detector 108 and any variation produces a voltage which adjusts the relative positioning of discs 42 and 44 with respect to the vertical sync signal. Disc 42 is provided with a speed indicator 123 which is detected by detector 124 to produce a signal which is converted by frequency to voltage converter 126 into a voltage which is compared in amplifier 128 with a motor speed reference voltage $V_M$. The voltage produced by amplifier 128 is applied to motor driver 120 to control the speed of motor 61 and of discs 42 and 44.

Although the variable speed shutter/variable diaphragm control system of FIG. 2 has been described with respect to specific mechanisms for adjusting the relative positioning of discs 42 and 44, it will be appreciated that other adjusting systems are contemplated within the scope of the present invention. Thus discs 42 and 44 could be driven by separate drivemotors with separate motor control and phase control circuits.

The invention has been described in detail with particular reference to preferred embodiments thereof, but it will be understood that variations and modifications can be effected within the spirit and scope of the present invention.

What is claimed is:

1. A video camera with automatically variable diaphragm and shutter speed control, comprising:
   image sensor means for converting the image of a scene into a video signal having a predetermined image repetition rate;
   variable diaphragm means for controlling the light intensity of said image on said sensor;
   variable shutter means for controlling the interval within an image repetition interval during which said sensor is exposed to said image; and
   control means for controlling the peak to peak level of said video signal at a constant level in response to changing light intensity of said image by first, setting said variable shutter means to the shortest exposure interval while controlling said variable diaphragm means in response to varying light intensity and, second, when said variable diaphragm means is opened to its maximum opening, by controlling said variable shutter means to increase the exposure interval while maintaining said diaphragm means at said maximum opening.

2. The video camera of claim 1 wherein said shutter means includes (1) first and second shutter discs, each of which has opening means which are alignable with said image sensor; (2) means for rotatably mounting said shutter discs so that they are rotationally displaceable relative to each other; (3) means for rotating said shutter discs at a predetermined rotational speed which is related to said predetermined image repetition rate and wherein said control means is linked to said mounting means to control the relative rotational displacement of said shutter discs to vary the relative opening of said opening means of said discs thereby to vary the interval during which said sensor is exposed.

* * * * *